July 24, 1962 R. MATSON 3,045,477
SOIL MOISTURE INDICATING GAGE
Filed March 2, 1961 2 Sheets-Sheet 1
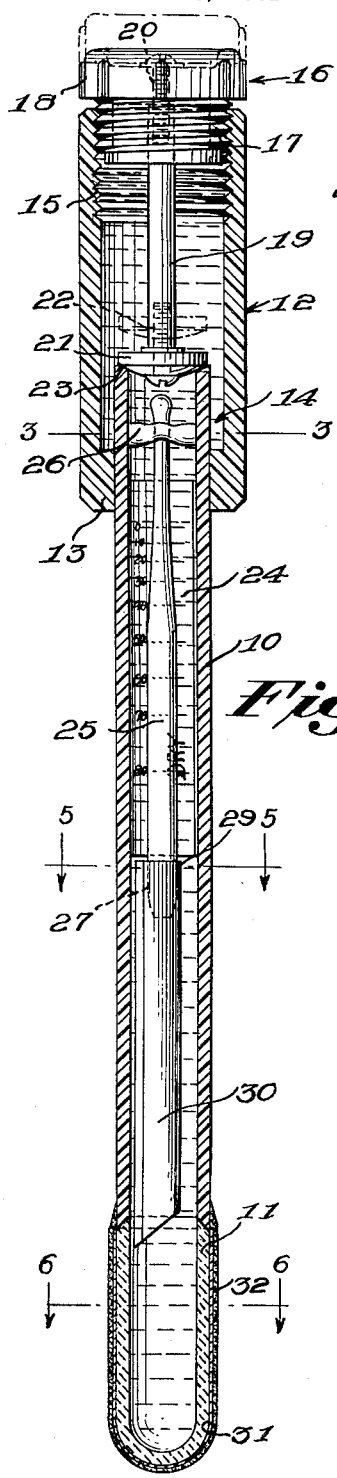
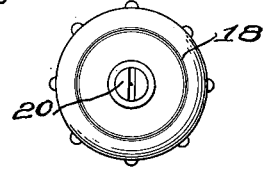
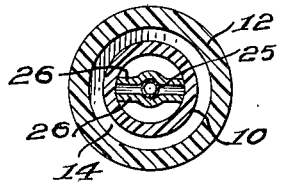
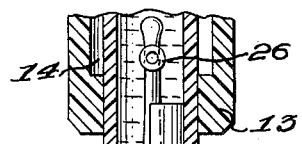
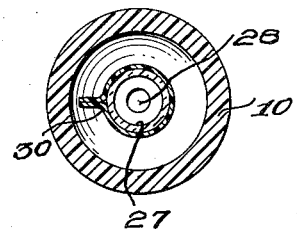
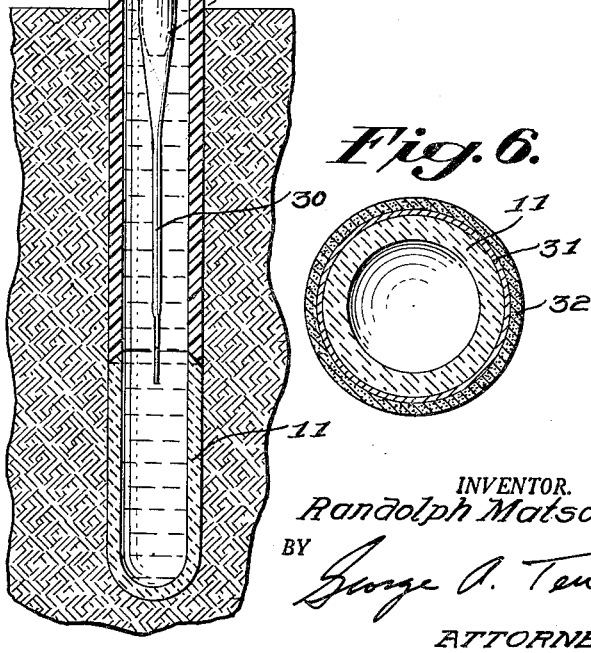
INVENTOR.
Randolph Matson.
BY George A. Tews
ATTORNEY.

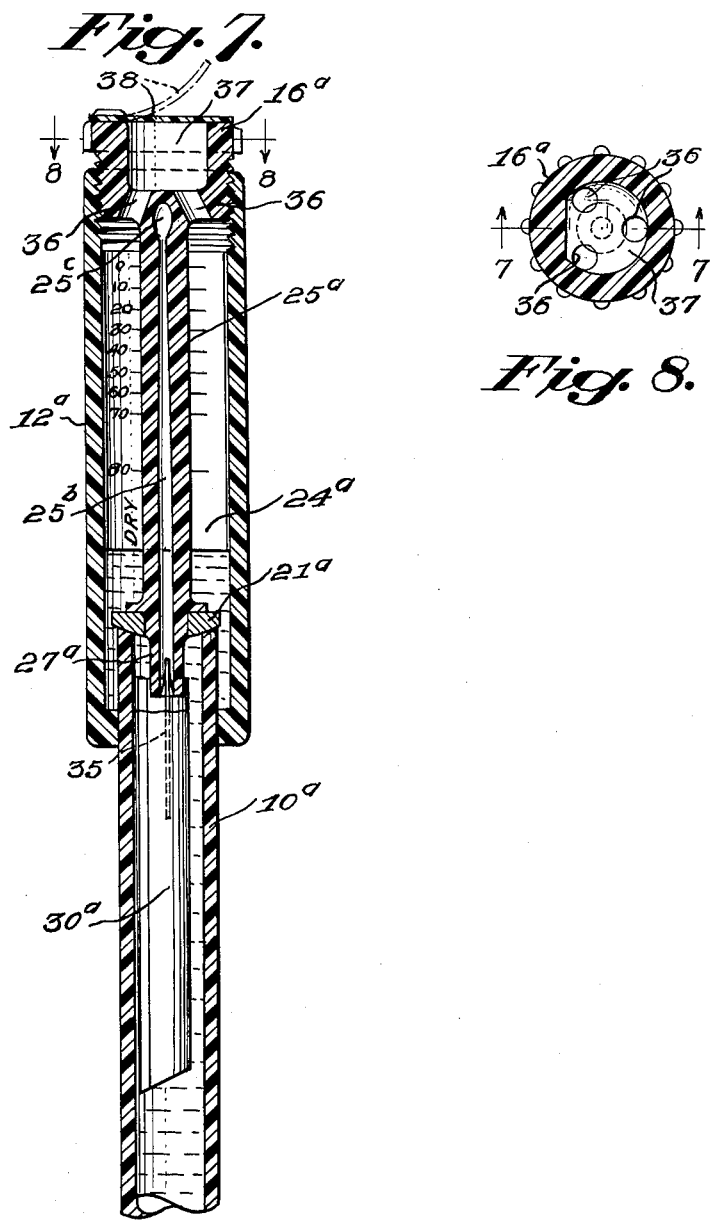

United States Patent Office 3,045,477
Patented July 24, 1962

3,045,477
SOIL MOISTURE INDICATING GAGE
Randolph Matson, 1954 Camino Loma Verde,
Vista, Calif.
Filed Mar. 2, 1961, Ser. No. 92,975
4 Claims. (Cl. 73—73)

This invention relates to a soil moisture indicating and measuring device which is adapted to be inserted within the ground adjacent the roots of plants or the like, wherein an indication will be observed as to the moisture content of the soil.

The present invention is an improvement over my former Patent No. 2,801,538 granted August 6, 1957 as well as my co-pending application Serial No. 859,680 filed December 15, 1959, now U.S. Patent No. 3,026,718.

One of the important improvements in this application over the former patent and the application referred to is the provision of a plastic tubular member secured to and extending substantially above the upper end of the outer indicating tube and which is adapted to contain a volume of surplus water.

A further object of the invention is the provision of a surplus water containing member as above referred to with which is associated a manually operable valve which co-acts with the upper end of the main or outer indicating tube whereby the water in the indicating tube may be replenished upon operation of the valve.

A further object of the invention is the provision of elastic means frictionally and adjustably engaged with the inner wall of the outer indicating tube and which is releasably engaged with the upper end of the inner indicating tube.

A still further object of the invention is the provision of a well defined by the upper end of the outer indicating tube and the lower end of the surplus water containing member.

A still further object of the invention is the provision of an adjustable scale which frictionally engages the inner wall of the outer indicating tube throughout its entire extent.

A still further object of the invention is the provision of water retaining means surrounding a ceramic cup at the lower end of the gage and which comprises an inner ply of paper and an outer ply of wax.

Other objects and advantages of the invention will become apparent in the course of the following detailed description, taken in connection with the accompanying drawing, wherein, FIGURE 1 is an axial vertical sectional view of the improved gage showing the ceramic cup externally covered for retention of water within the gauge during storage thereof.

FIGURE 2 is a top plan view of the structure of FIGURE 1.

FIGURE 3 is a horizontal sectional view as observed in the plane of line 3—3 on FIGURE 1.

FIGURE 4 is an axial sectional view of the lower end portion of the gage which is operatively supported within the ground for operation of the gage.

FIGURE 5 is an enlarged horizontal sectional view as observed in the plane of line 5—5 on FIGURE 1.

FIGURE 6 is an enlarged horizontal sectional view as observed in the plane of line 6—6 on FIGURE 1.

FIGURE 7 is a fragmental axial vertical sectional view corresponding in general to FIGURE 1 but disclosing a modified embodiment of the invention, the section being in the plane of line 7—7 on FIGURE 8.

FIGURE 8 is a horizontal sectional view as observed in the plane of line 8—8 on FIGURE 7.

Referring now in detail to the drawing, the improved moisture indicating and measuring device will be seen to comprise an outer indicating tube 10 of transparent plastic material whose lower end is closed by means of a ceramic cup 11. Disposed at the upper end of the tube 10 is a transparent cylindrical plastic surplus water container 12 which is of substantially greater diameter than said indicating tube 10 and whose lower end 13 engages and is secured to the tube 10 substantially below the upper end thereof as is clearly indicated in FIGURE 1 thereby providing a well 14.

The upper end of the water container 12 is internally threaded as at 15 and with which cooperates a plug 16 having a lower threaded portion 17 operatively engaged with the threads 15 and the upper end of the plug comprises a finger engageable portion 18.

A valve stem 19 has the upper end thereof secured to the plug 16 as by means of a screw 20 and to the lower end of the valve stem 19 is secured a valve 21 as by means of a screw 22.

The upper end of the tube 10 is provided with a valve seat 23 with which the valve 21 cooperates.

Disposed within the tube 10 is a flexible and adjustable scale 24 of transversely arcuate form which frictionally engages the inner wall of the outer tube 10 throughout its entire area. The inner gauge member comprises a relatively small transparent tube 25 adapted to receive a colored indicating fluid and which is sealed at the upper end thereof.

At this point it will be noted that the upper closed end of the tube 25 is rounded and is somewhat enlarged and the tube is retained in vertical position within the tube 10 and by means of a relatively short section of rubber hose 26 which intermediate its ends is apertured for receiving the said upper end of the tube 25, and the opposite ends of the hose frictionally engage the inner wall of the tube 10.

The indicating tube 25 terminates adjacent its lower end in a reduced portion 27 which has a small opening 28 therein.

Adhesively secured to the lower end of the tube 25 is the upper end 29 of a sack or container 30, the said sack being formed of a material known in the trade as "Kel–F" which is a synthetic plastic of trifluorochlorethylene which material is capable of heat sealing and is further of zero moisture absorption properties. In view of the fact that the indicating fluid containing sack 30 is made of a material of zero moisture absorption, it follows that the colored indicating fluid contained within the sack will not be diluted with water by osmosis causing failure of the calibration and distension of the sack 30. Further, with such an arrangement, it has been found possible to fill the gages with water at the point of distribution without the possibility of the instrument malfunctioning because water has entered the sack 30 as by the action of osmosis.

As is shown in FIGURE 1, the gage when not in use has the ceramic cup portion 11 thereof covered with a layer of paper 31 and an outer layer of wax 32.

In the use of the device as shown in FIGURE 1, a hole is formed in the ground surface where it is desired to use the gage, the hole being formed as by a pointed instrument which may be driven into the ground and which is sufficiently large to provide a hole in which the gage will be positioned after the tool has been removed therefrom, the hole preferably extending to the vicinity of the roots of the plants or the like where it is desired to determine the moisture content of the soil.

The wax and paper coating 32 and 31 is then removed from the porous ceramic cup 11 and the gage is disposed within the resulting hole in the ground. If the ground adjacent to the porous ceramic cup 11 is relatively wet, moisture will seep through the wall of the cup and thereby build up a pressure on the water within the outer tube 10, which pressure will be transmitted to the outer wall of the sack 30 and such pressure will cause the indicating fluid to move upwardly within the indicating tube 25 and a reading on the graduated scale 24 can be readily observed, determined by the top of the column of the indicating fluid with respect to the graduated scale.

In the event that the ground is relatively dry, water or a certain amount of moisture will move from the outer tube 10 through the porous cup 11 and in which event pressure on the sack 30 will be reduced and the indicating fluid within the inner tube 25 will drop, and reading the same against the graduated scale will indicate that the soil is relatively dry. Under these conditions, water can be added to the soil until the gauge indicates that water has penetrated to the depth of the porous ceramic cup 11 when the indicating column will return to "0." Water may then be withheld until the gauge indicates that more water is needed to produce the best moisture soil condition for proper growing of the planted crops, flowers or the like.

It will be noted that the scale 24 may be readily adjusted to the zero position by merely sliding same vertically over the inner wall of the outer tube 10. The zero adjustment is particularly important on long tensiometers where the hydrostatic effect of the column of water becomes appreciable.

The tension at the ceramic cup 11 is correctly shown when the reading is zero while the cup is immersed in water. When, for example, a thirty inch instrument is adjusted in this manner, the column will extend about one-eighth of an inch above the zero position when the plug 16 is removed.

It is to be particularly observed that the surplus water container 12 provides for readily replenishing water within the outer indicating tube 10 which may be effected by turning the plug 16 with a resulting lifting of the valve 21 from its seat 23 until sufficient water has entered the tube.

Furthermore, the provision of the well 14 provides for unobstructed view of air bubbles and also provides a sediment trap.

Referring now to FIGURES 7 and 8 it will be seen that the modified embodiment of the invention is generally similar to the first embodiment above described but differs therefrom in the following respects. While in the first embodiment of the invention, the inner gauge tube 25 is disposed within the tube 10 and is wholly separate from plug 16, the inner gauge tube 25a is disposed within the upper water container 12a and is unitary with the plug 16a. Furthermore, a valve 21a is supported by the tube 25a adjacent its lower end and the tube comprises a reduced extension 27a disposed within the upper end of a sack 30a, which extends downwardly into the tube 10a.

As is clearly indicated in FIGURE 7, a restricting tube 35 has the upper end thereof disposed within the lower end of the tube 25a and which extends downwardly into the sack 30a.

The plug 16a is provided with a plurality of water receiving openings 36 which communicate with the tube 12a and a chamber 37 in the cap.

A flexible plastic flap 38 is secured to the upper face of the plug 16a at one side thereof and the same is normally constrained to a closed position as is indicated in full lines in FIGURE 7, while same is readily capable of being raised as indicated in dotted lines for admission of water into the chamber 37.

The tube 25a is provided with a bore 25b for receiving indicating fluid and the upper end of such bore is bulbed as is indicated at 25c. The lower end of the bore 25b communicates with the sack 30a through the restricting tube 35.

It is to be observed that the adjustable scale 24a is disposed within the water container 12a in surrounding relation to the tube 25a.

The advantages of the modified structure above described is fewer parts, easier to read, not requiring the removal of the cap to replenish the water supply and which protrudes less from the ground, when in use.

Having set forth the invention in accordance with a preferred structural embodiment thereof, what is claimed and desired to be secured by U.S. Letters Patent is:

1. In a soil moisture indicating gauge comprising a water supporting transparent open ended tube, a transparent indicating tube disposed co-axially of said water supporting tube, a flexible arcuate sheetlike scale disposed about the axis of said transparent indicating tube, and a bellows-like sack secured to and in communication with the lower end of said transparent indicating tube; the improvement, comprising a surplus water container having a lower open end engaging and secured to said outer tube adjacent to but below the upper end thereof, and a manually operable valve disposed within said surplus water container for discharge of water therefrom and into said outer tube, wherein said transparent indicating tube is disposed within said surplus water container, a threaded plug unitary with the upper end of said indicating tube and having threaded engagement with the inner wall of said surplus water container and the lower end of said indicating tube being provided with a valve cooperating with the water supporting transparent open ended tube.

2. The structure according to claim 1 wherein the said threaded plug is provided with a chamber and water receiving openings disposed between the chamber and the surplus water container.

3. The structure according to claim 1, wherein said plug is provided with a flexible, normally closed valve.

4. The structure according to claim 3, wherein said plug is provided with a chamber beneath said flexible valve, and openings in said plug communicating with said chamber.

References Cited in the file of this patent

UNITED STATES PATENTS

| | | |
|---|---|---|
| 2,801,538 | Matson | Aug. 6, 1957 |
| 2,878,671 | Prosser et al. | Mar. 24, 1959 |

FOREIGN PATENTS

| | | |
|---|---|---|
| 435,815 | Germany | Apr. 1, 1925 |
| 444,330 | Great Britain | Mar. 19, 1936 |